United States Patent [19]

Haase et al.

[11] 4,215,850
[45] Aug. 5, 1980

[54] WINCH

[75] Inventors: Reinhold A. Haase, Hastings; Norman D. Brockelsby, Grand Island, both of Nebr.; Daniel W. Pike, Mission, Kans.

[73] Assignee: Dutton-Lainson Company, Hastings, Nebr.

[21] Appl. No.: 958,372

[22] Filed: Nov. 7, 1978

[51] Int. Cl.³ .............................................. B66D 3/00
[52] U.S. Cl. ................................. 254/350; 254/339; 254/356; 414/537
[58] Field of Search ................... 254/166, 150, 186 R, 254/187, 186 HC, 187.1, 187.2, 187.3, 187.4; 414/537; 74/212, 355; 192/41 S, 41 A, 43

[56] References Cited

U.S. PATENT DOCUMENTS

| 2,714,434 | 8/1955 | Peterson | 254/186 X |
| 2,891,767 | 6/1959 | Armington | 254/186 |
| 3,088,709 | 5/1963 | Hunt | 254/187.1 X |
| 3,474,922 | 10/1959 | Wood | 214/85.5 |
| 3,519,247 | 7/1970 | Christison | 254/150 R |
| 3,773,294 | 11/1973 | Alcott | 254/187 |

*Primary Examiner*—Edward J. McCarthy
*Attorney, Agent, or Firm*—Allegretti, Newitt, Witcoff & McAndrews

[57] ABSTRACT

A winch includes a direct current reversible motor operable to drive a gear train to wind or unwind cable from a drum and also includes first and second clutch mechanisms in the gear train that provide respectively (1) internal loading of the winch to prohibit undesirable unwinding of cable and (2) infinite clutch control between free wheeling operation and direct gear train drive of the winch. The first clutch mechanism is a sprag clutch which is operated against a brake load built into the winch. The second clutch mechanism includes clutch plates which are engaged proportional to the force of a thrust bearing controlled by a manually operated handle.

10 Claims, 4 Drawing Figures

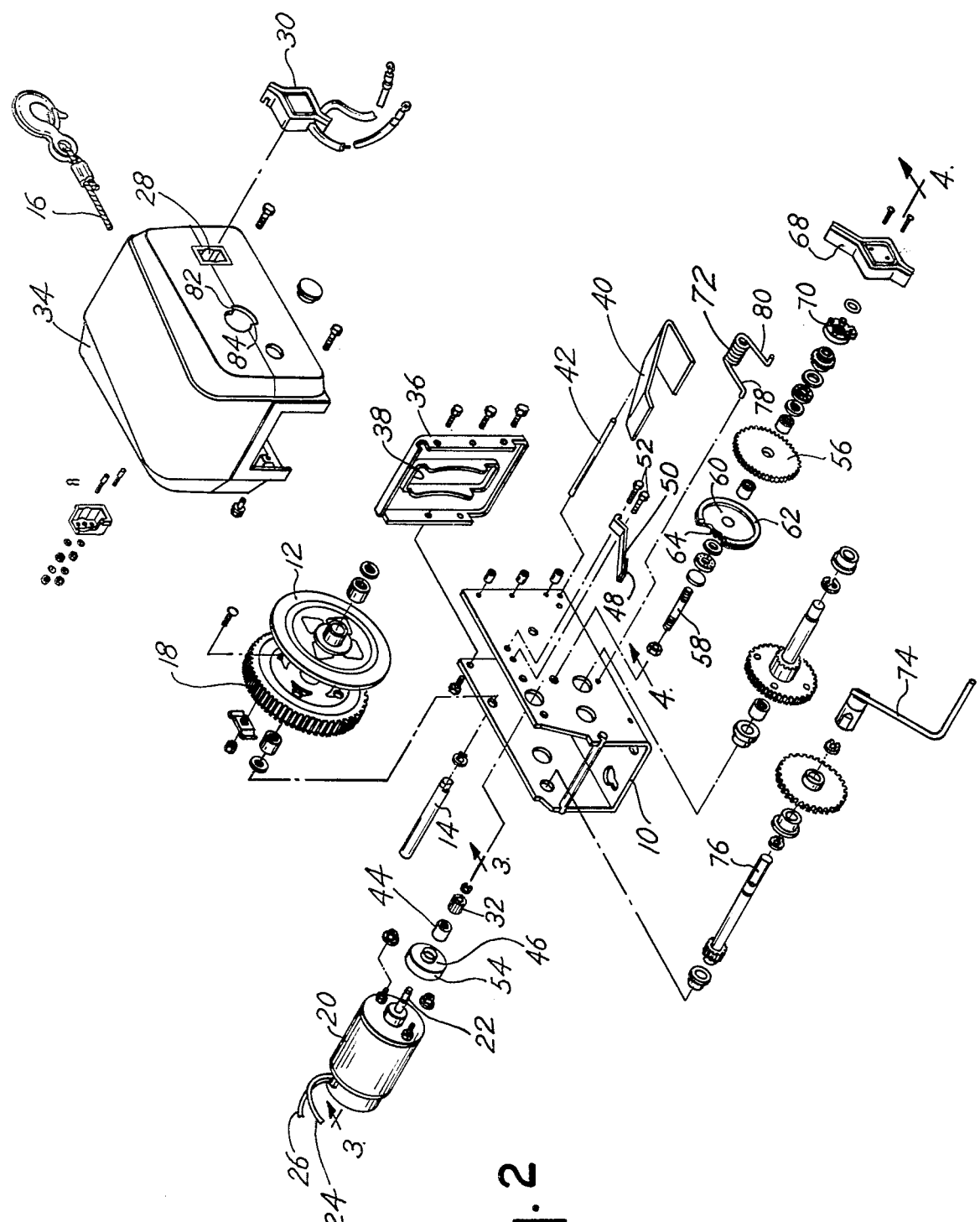

WINCH

BACKGROUND OF THE INVENTION

This invention relates to an improved winch mechanism and more particularly to a winch mechanism which provides for free wheeling operation of the winch, power winding of the winch, power unwinding of the winch, and a controlled load unwinding of the winch.

Winch devices, particularly winch mechanisms driven by a small, reversible, direct current motors have in recent years been commonly used as an attachment to boat trailers and the like for movement of boats and other goods onto or off of the trailer. Typically, such winches are attached to the front end of the trailer. A cable attached to a drum of the winch may then be wound or unwound by operation by a direct current motor to thereby move a boat from the trailer or place a boat back upon a trailer.

Often it is desirable to provide for free wheeling operation of the winch unimpeded by the motor. Also, during the unloading operation from the trailer, the weight of the load may tend to cause uncontrolled or excessively fast operation of the winch. Therefore, it is desirable to be able to control the speed of operation of the unwinding of cable from the drum. Finally, it is desirable to provide an additional load in the winch mechanism so that the load being moved remains locked in position when the winching operation is complete.

Heretofore powered winches have provided some of these desired features. Typical of such prior art winch mechanisms are those shown in Ahlbin U.S. Pat. No. 3,150,861 and Ahlbin U.S. Pat. No. 3,051,447 Wood U.S. Pat. No. 3,474,922 and Alcott U.S. Pat. No. 3,773,294. However, no known winch is available which incorporates all of the features described in a single unitary winch mechanism. Thus, a need for a winch mechanism incorporating all of the described features has not heretofore been satisfied. The present invention constitutes a mechanism which provides the described objectives.

SUMMARY OF THE INVENTION

Briefly, the present invention comprises a powered winch mechanism which includes a drum for a cable, a drive train to drive the drum and a power source, preferably a reversible direct current motor, all mounted on a frame. A first clutch mechanism associated with the drive shaft of the winch motor includes a clutching and brake arrangement which provides an additional load on the motor and thus a braking effect to hold the load being moved in position when the motor is not being operated. A second clutch arrangement in the drive train is controlled by a manual handle and provides for controlled transfer of force through the drive train. The transfer of force through the drive train from the motor is infinitely variable and may also be totally terminated by operation of the manually controlled clutch. The invention also includes features such as hand crank operation, in the event the power is unavailable to operate the electric motor, and a cable winding control assembly. Additionally, a switch mechanism for control of the motor is disclosed. This switch mechanism is the subject matter of a separate patent application entitled "Improved Dead Man Switch for a Winch," U.S. Ser. No. 958,423, filed Nov. 7, 1978, Reinhold Haase, inventor, which application is incorporated herewith by reference.

Thus, it is an object of the present invention to provide an improved winch.

It is a further object of the present invention to provide an improved winch which includes a first clutch assembly designed to selectively impose a load upon the winch and thereby provide for automatically locking the load in position when the motor is not being powered.

A further object of the present invention is to provide a winch having a clutch assembly in the drive train which is manually adjustable to provide for infinite control of the transmission of drive force through the drive train to drive the cable drum while at the same time allowing powered operation in two directions.

Another object of the present invention is to provide an improved winch which is compact in design, economical to manufacture, easy to repair and reliable.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is a partially exploded perspective view similar to FIG. 1 wherein the cover for the winch has been removed to reveal the internal structure particularly the clutch mechanisms associated with the winch;

DESCRIPTION OF THE PREFERRED EMBODIMENT

Figure 1:
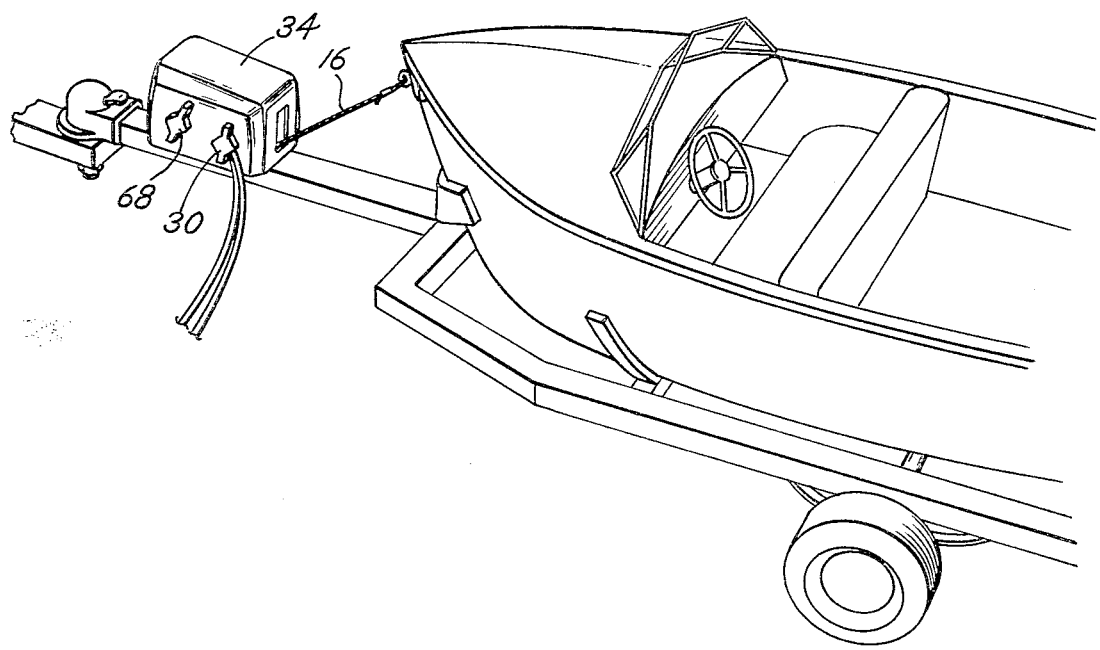
FIG. 1 is a perspective view of the improved winch of the present invention.
Figure 3:
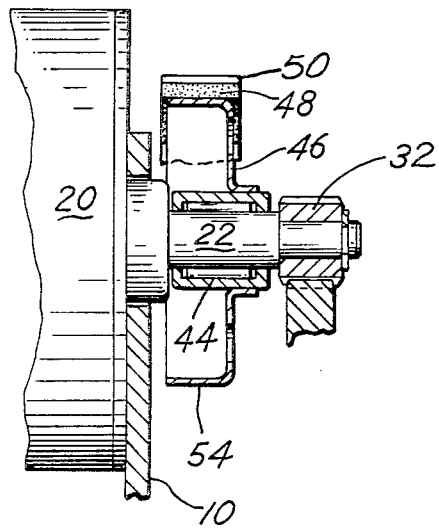
FIG. 3 is a cross sectional view of the first clutch mechanism associated with control of the drive means or direct current motor for the winch.
Figure 4:
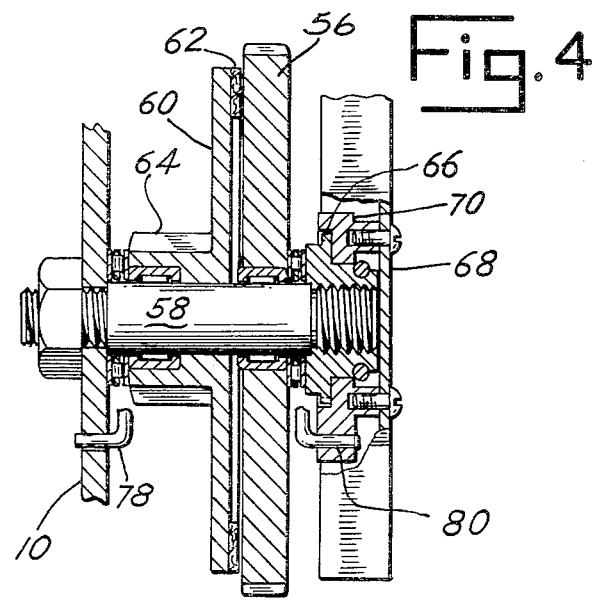
FIG. 4 is a cross sectional view of the second clutch mechanism taken substantially along the line 4—4 in FIG. 2.

Referring to the figures, the winch of the present invention includes a frame 10 with a cable drum 12 mounted on a shaft 14 so that a cable 16 may be wound and unwound from the drum 12 in response to operation of the winch. A spur gear 18 is also mounted on shaft 14 to drive the drum 12. The spur gear 18 comprises a portion of the gear train which connects a reversible, direct current electric motor 20 with the gear 18.

The motor 20 is mounted on the frame 10 and includes an output shaft 22. Lead wires 24 and 26 for the motor 20 to connect to a receptacle 28 in winch cover 34. Receptacle 28 is part of a switch mechanism 30 described in application Ser. No. 958,423, filed Nov. 7, 1978 heretofore referenced and incorporated herewith by reference.

The motor 20, and more particularly the output shaft of the motor 20, operates to drive a spur gear 32 which in turn acts through a series of gears mounted on shafts to define a gear train and ultimately drive spur gear 18. It is to be noted that the gear train arrangement provides a mechanical advantage whereby significant weight may be moved by operation of the winch.

The cover or shroud 34 is positioned over the entire assembly and is attached to the frame 10. A cable guide plate 36 is also attached to the frame 10 so as to guide the cable 16 through opening 38 of plate 36 for winding on the drum 12. Plate 36 also serves to protect an operator from placing a hand in pinch points within the winch. A cantilever cable guide member 40 retained by a rod 42 is biased against cable 16 wound on drum 12 to thereby provide for proper winding of the cable 16 and prevent entanglement of the cable 16.

The improvement of the present invention relates to two clutch assemblies which are incorporated with the winch in the drive train intermediate the shaft 22 and the spur gear 18. These clutch assemblies, alone or in combination with the various other features of the winch, comprise the invention.

The first clutch assembly comprises a sprag clutch assembly 44 affixed to the shaft 22 of the motor 20. The sprag clutch assembly 44 may be any of a number of types of clutch devices available. It is connected about the shaft 22 so that upon rotation of the shaft 22 in a first rotational sense, the clutch assembly 44 will not interfere with rotation of the shaft 22. Upon reverse rotation of the shaft 22, however, the clutch assembly 44 will be engaged by the shaft 22 and cause rotation of a drum member 46 associated with the sprag clutch assembly 44.

Rotation of the drum member 46 is opposed by a friction brake pad 48 which is attached to a cantilever spring 50. Spring 50 is mounted on frame 10 by means of fastening bolts 52. The pad 48 frictionally engages the outside brake surface 54 of drum member 46 and thereby opposes the operation of the shaft 22.

The sprag clutch assembly 44 is arranged to provide braking action whenever the motor 20 is not operated. Typically when a weight or load is being supported by the cable 16, force is transferred through the winch gearing tending to forcibly cause the motor shaft 22 to rotate. In such an event the braking action provides the necessary resistance to prohibit movement of any of the winch gears and unwinding of cable 16 from drum 12. Whenever the motor 20 is operated so as to unwind cable from the drum 12 the weight of the load tends to augment or supplement the operation of the motor 20 and the braking action is easily overpowered. Of course, upon reverse operation of the motor 20 the sprag clutch assembly 44 does not come into operation. Typically the reverse operation of the motor 20 occurs during a winding operation of cable 16 upon drum 12 when a load is being lifted by operation of the winch. In such event, braking of the motor 20 does not occur, thereby allowing the motor 20 to operate at full efficiency without unnecessary loss of power to overcome the braking action.

The second clutch assembly incorporated within the winch of the invention is a drive train clutch situated in the gear train and operative to transmit or terminate transmission of the motor drive through the gear train. Thus, spur gear 32 mounted on shaft 22 associated with motor 20 is positioned to drive a combined spur gear and friction plate 56 which is mounted on a shaft 58 attached to frame 10. The friction plate 56 is axially translatable along the shaft 58.

A separate clutch plate 60 mounted on shaft 58 includes a clutch pad 62 in opposed relation to one side of friction plate 56. A small spur gear 64, which constitutes a continued portion of the power train or gear train for the winch, is affixed to the clutch plate 60.

Positioned on the other side of the friction plate 56 is a thrust bearing assembly 66 which is threadably attached to the end of shaft 58. By adjusting the compression force of the thrust bearing 66 against the friction plate 56, the plate 56 is, in turn, clutched or engaged with the clutch plate 60. Note plates 56 and 60 are limited in axial movement by frame 10. Thus compression of bearing 66 against plate 56 and threaded travel of bearing 68 on shaft 58 is limited by frame 10. In this manner the plate 56, which is driven by gear 32, will drive plate 60. The driving force is transmitted through plate 60 to drive gear 64 and thus the remainder of the gear train including gear 18 which drives drum 12. If the thrust bearing 66 is unthreaded or axially translated from the shaft 58, the plate 56 may translate axially and disengage from pad 62 of plate 60 thus terminating transmission of force through the gear train.

The force imposed by thrust bearing 66 against plate 56 is controlled by means of a handle 68. Handle 68 incorporates an orbit gear 70 that pivots the thrust bearing 66 on shafts 58. Thus as bearing 66 is driven by gear 70, it is wound or unwound from shaft 58.

The orbit gear 70 cooperates with a spring 72. One end or leg 78 of the spring 72 is affixed to the frame 10 and the opposite end or leg 80 is attached to gear 70. The spring 72 is an over center acting spring and is arranged to bias the orbit gear 70 and thus the thrust bearing 66 so as to thread the gear onto the shaft 58 and force the bearing 66 against the plate 56 causing engagement of the plates 56, 60.

The handle 68 may be manually rotated to overcome the force of the spring action 72 and unwind the bearing 66 from shaft 58. Substantially infinite adjustment of force of the plate 56 against plate 60 is thereby provided. The handle 68 may also be moved to an over center position of spring 72 which unwinds the bearing 66 from shaft 58 and maintains the bearing 66 in the nonthrust position 50 so that the plates 56 and 60 are totally disengaged to permit free wheeling of the drum 12. That is, the handle 68 may be rotated clockwise against stop 82 in FIG. 2 so that the legs 78, 80 of spring 72 are moved beyond an over center position. The handle 68 and bearing 66 wound then remain in the bearing disengage position until manually returned to initial bearing engage position. Stop 84 molded in the cover 34 limits the travel of handle 68 in the counterclockwise direction.

In the event the motor 20 becomes inoperative, it is possible to disengage the clutch plates 56 and 60 and attach a keyed handle 74 to the shaft 76. The gear train may then be manually driven.

It can be seen that the improved winch of the present invention includes a clutch mechanism for infinitely varying the drive force transmitted through the gear train. It also includes a clutch and brake assembly which provides for automatic locking of the winch mechanism so that a winched load is supported in position without need for any manually operated locking devices. Therefore, while there has been set forth a preferred embodiment of the invention, it is to be understood that the invention shall be limited only by the following claims and their equivalents.

What is claimed is:

1. In a winch of the type including a frame, a gear train affixed to the frame, a cable drum affixed to the frame and driven by the gear train, and means for driving the gear train, the improvement of an adjustable clutch mechanism in the gear train between the means for driving and the drum, the adjustable clutch mechanism including:

a clutch shaft in the gear train;

a friction plate on the shaft and axially movable on the shaft;

said means for driving the gear train attached to the friction plate;

a clutch plate on the shaft in opposed relation to one side of the friction plate;

a thrust bearing threaded on the shaft in opposed relation to the opposite side of the friction plate; and means for adjusting the force of the thrust bearing on the friction plate to thereby engage the friction plate against the clutch plate.

2. The improvement of claim 1 wherein said means for adjusting comprise a manually operated handle affixed to the thrust bearing and pivotal to adjust the force of the thrust bearing against the friction plate.

3. The improvement of claim 2 wherein said thrust bearing is biased to normally provide thrust force against the friction plate thereby causing engagement of the clutch mechanism.

4. The improvement of claim 1 including means for adjusting the thrust bearing and releasing the thrust bearing from the friction plate to provide for free wheeling winch operation.

5. The improvement of claim 1 wherein said drive means includes reversible drive means for driving a drive shaft to the gear train and also includes means for internally loading the drive shaft when the drive shaft is driven in one rotational sense.

6. The improvement of claim 5 wherein said means for loading is engaged whenever the gear train is being driven by a weight on the cable to unwind cable from the drum.

7. The improvement of claim 5 wherein said means for loading comprise a sprag clutch on the drive shaft with one side of the clutch attached to the shaft and the opposite side of the clutch attached to friction brake means to thereby provide a load to the drive means upon rotation in said one rotational sense of the drive shaft.

8. The improvement of claim 7 wherein said friction brake means comprise a drum affixed to the drive shaft and a brake pad in frictional engagement with the drum.

9. The improvement of claim 8 wherein said brake pad is affixed to a cantilever spring blade biased against the drum and attached to the frame.

10. In a winch of the type including a frame, a gear train affixed to the frame, a cable drum affixed to the frame and driven by the gear train, and means for driving the gear train, the improvement of reversible drive means for driving a drive shaft to the gear train and means for loading the drive shaft when driven in one direction.

* * * * *